(12) United States Patent
Montero-Escuder et al.

(10) Patent No.: US 8,083,513 B2
(45) Date of Patent: Dec. 27, 2011

(54) APPARATUS FOR MANUFACTURING A THREE-DIMENSIONAL OBJECT LAYER BY LAYER

(75) Inventors: Jesus Montero-Escuder, Munich (DE); Jochen Weidinger, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 496 days.

(21) Appl. No.: 11/986,360

(22) Filed: Nov. 21, 2007

(65) Prior Publication Data

US 2008/0156263 A1    Jul. 3, 2008

(30) Foreign Application Priority Data

Nov. 22, 2006   (DE) .................. 10 2006 055 078

(51) Int. Cl.
*B28B 1/16* (2006.01)

(52) U.S. Cl. .............. 425/375; 425/185; 425/174.4; 264/308; 264/497; 118/256

(58) Field of Classification Search .......... 425/174.4, 425/375, 185; 264/113, 308, 401, 497; 118/100, 118/200, 120, 242, 256
See application file for complete search history.

(56) References Cited

U.S. PATENT DOCUMENTS

| | | | | |
|---|---|---|---|---|
| 5,252,264 A | * | 10/1993 | Forderhase et al. | 264/497 |
| 5,432,045 A | * | 7/1995 | Narukawa et al. | 430/269 |
| 5,730,925 A | | 3/1998 | Mattes et al. | |
| 6,136,257 A | | 10/2000 | Graf et al. | |
| 7,690,909 B2 | * | 4/2010 | Wahlstrom | 425/375 |
| 2006/0219163 A1 | | 10/2006 | Merot et al. | |
| 2007/0298182 A1 | | 12/2007 | Perret et al. | |

FOREIGN PATENT DOCUMENTS

| | | |
|---|---|---|
| DE | 19514740 C1 | 4/1996 |
| DE | 198 13 742 C1 | 7/1999 |
| DE | 10300959 A1 | 7/2004 |
| DE | 103 60 094 A1 | 9/2005 |
| DE | 102005016940 A1 | 10/2006 |
| EP | 1 769 904 A2 | 4/2007 |

\* cited by examiner

*Primary Examiner* — Maria Veronica Ewald
(74) *Attorney, Agent, or Firm* — McDonnell Boehnen Hulbert & Berghoff LLP

(57) ABSTRACT

Apparatus for manufacturing a three-dimensional object (3) by solidifying a powdery constituent material layer by layer at the positions corresponding to the profile of the object (3) to be manufactured in the corresponding layer, by the action of a laser or another energy source comprises a support (2) on which the object (3) is formed and an applicator (6, 7) for applying a layer of the constituent material onto the support or a layer at least partially solidified in advance. The applicator (6, 7) has a receiving device (40) for receiving a applying module such as a blade module (30). The receiving device (40) is formed in a way so that the applying module (30) can be exchangeably inserted into and removed from the receiving device (40) in a way that a predetermined position of the applying module (30) in the receiving device (40) is reproducibly determined.

37 Claims, 3 Drawing Sheets

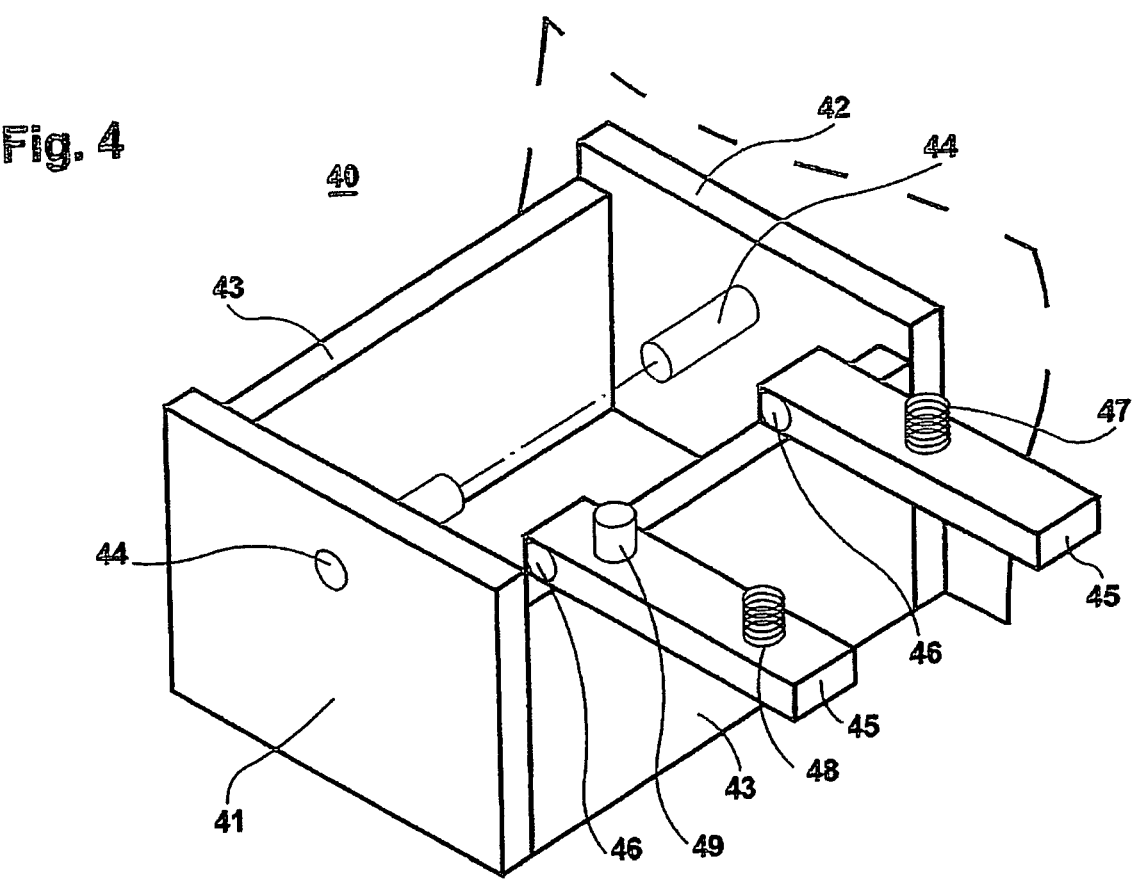
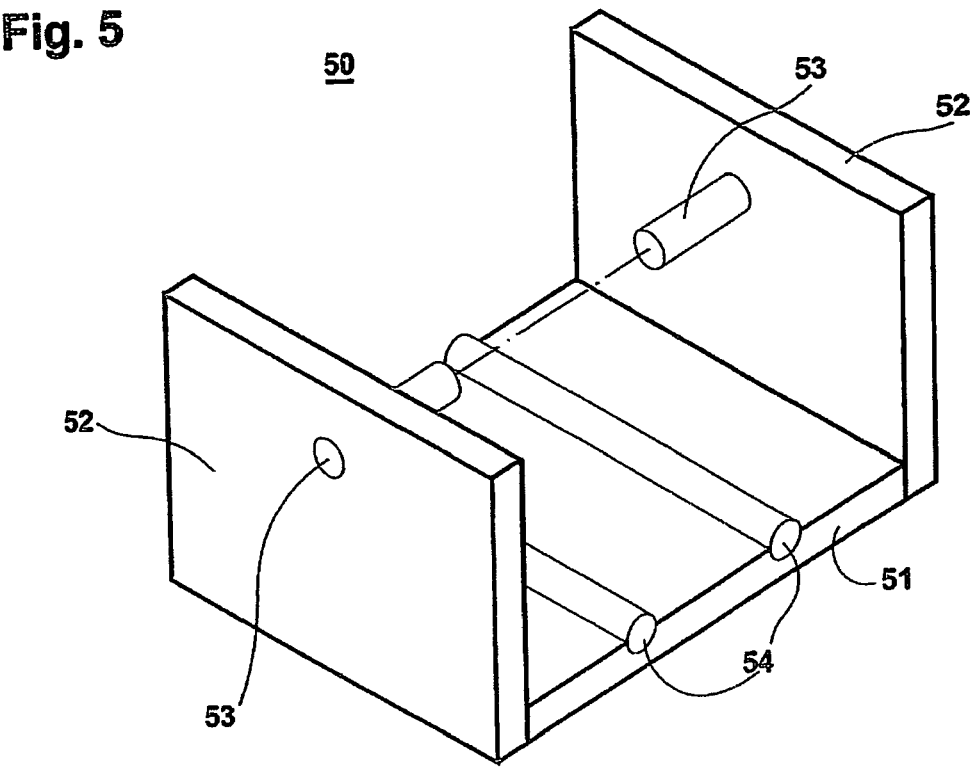

APPARATUS FOR MANUFACTURING A THREE-DIMENSIONAL OBJECT LAYER BY LAYER

BACKGROUND OF THE INVENTION

The present invention relates to an apparatus for manufacturing a three-dimensional object layer by layer from a powdery constituent material.

From DE 195 14 740 C1, an apparatus and a method for manufacturing a three-dimensional object by laser sintering are known, wherein application and smoothing of a layer of the powdery constituent material in a working plane is carried out by an applicator in form of a blade. At its lower edge on the side showing towards the application direction, the blade has a chamfer serving for compacting the applied powdery constituent material. On the side opposite to the application direction, a further chamfer is formed which serves for smoothing an already compacted layer. A modified embodiment has roundings instead of chamfers.

In the practice, the optimum values for the various dimensions of the blade depend on different parameters, among others on the layer thickness of the layer to be applied and on the material properties of the powdery constituent material. Values are selected which lead to acceptable results under different known and imaginable conditions. Due to such a tradeoff, it is possible to obtain an acceptable process for different conditions. However, if a powdery constituent material is used whose material properties significantly differ from the average of the imaginable materials, it is possible that during the application of the layer the optimum results are not achieved, so that another form of the blade and/or another distance from the working plane would be required.

However, replacing the blades at such an apparatus is time consuming, since the parallelism of the blades to the working plane and the correct distance from the working plane have to be exactly adjusted every time.

BRIEF SUMMARY OF THE INVENTION

For solving this problem, applicants internally know an apparatus in which a blade is rotatably supported and the angle between the lower edge of the blade and the working plane is adjustable by a setting screw. In this apparatus, however, only one parameter (the angle between the lower edge of the blade and the working plane) can be adjusted, so that the working conditions can not be optimized for all the different requirements.

The object of the present invention therefore is to provide an apparatus for manufacturing a three-dimensional object by solidifying a powdery raw material layer by layer, wherein an improved layer application is made possible for different process parameters such as different layer thicknesses and different material properties of the constituent materials.

The object is attained by an apparatus for manufacturing a three-dimensional object layer by layer according to the claimed invention.

By providing an exchangeable applying module which can be quickly and easily inserted into and removed from the receiving device, it is possible to obtain an optimum layer application and thus an improvement of the manufactured objects in surface quality and dimensional accuracy over a large range of material properties and layer thicknesses by selecting and inserting the applying module adjusted in advance which is optimally suited for the presently prevalent requirements. Manufacturing three-dimensional objects with different process parameters in a short succession of time is made possible.

Further features and advantages of the invention will appear from the description of embodiments with reference to the enclosed drawings. in the figures:

BRIEF DESCRIPTION OF THE SEVERAL VIEWS OF THE DRAWING

FIG. 4 is a perspective view of an embodiment of a blade module holder; and

FIG. 5 is a perspective view of an embodiment of an adjusting device for an exchangeable blade module.

DETAILED DESCRIPTION OF THE INVENTION

In the following, an exemplary of an apparatus for manufacturing a three-dimensional object layer by layer according to the present invention is described with reference to FIG. 1 to 4.

As an example for an exchangeable applying module to be used for powdering, a blade module will be described.

Figure 1:
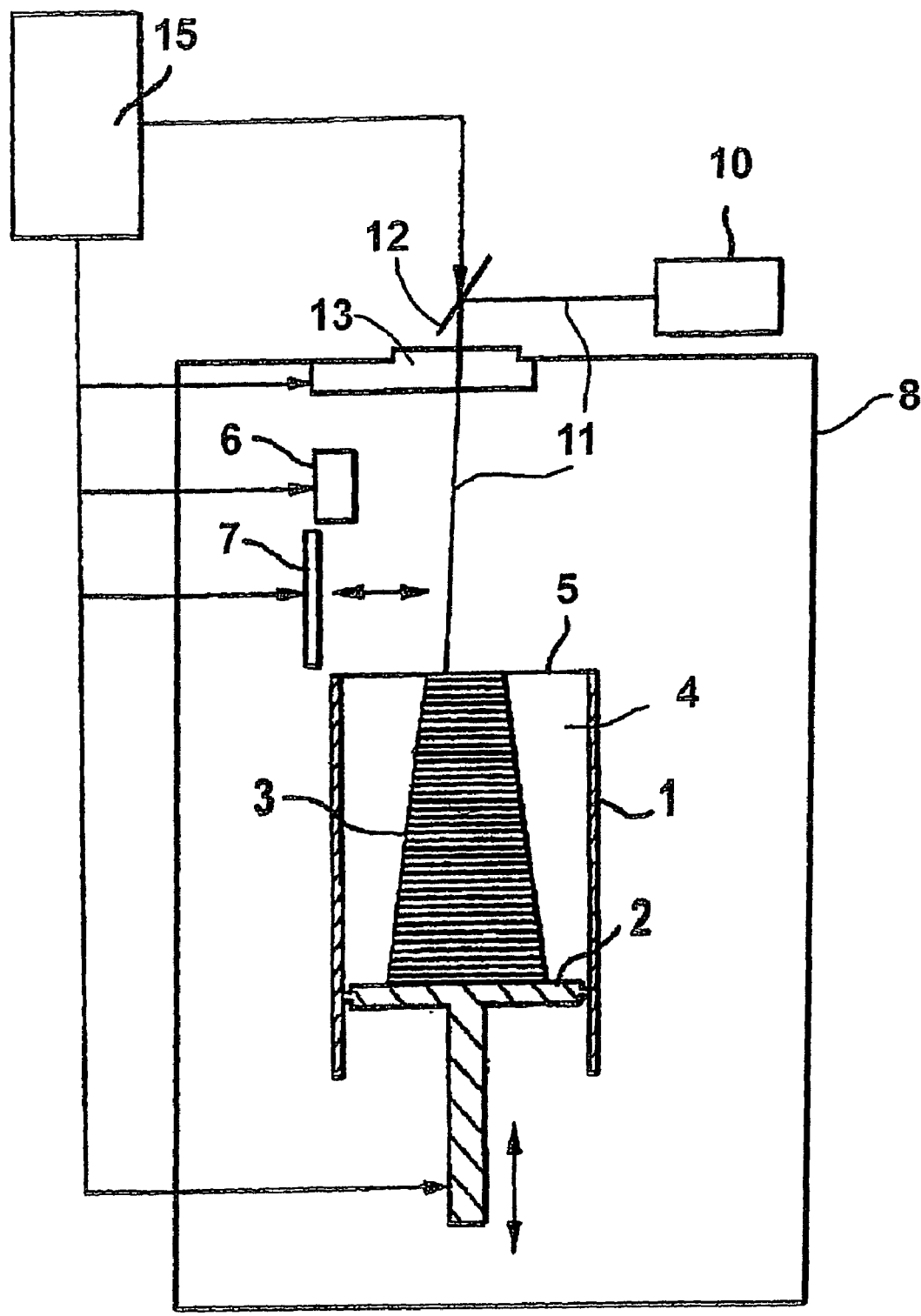
FIG. 1 is a schematic block diagram of an embodiment of an apparatus for manufacturing a three-dimensional object layer by layer.

As can be seen from FIG. 1, the apparatus for manufacturing a three-dimensional object layer by layer has a build-up container 1 which is open at the top. In this container 1, a support 2 with a substantially plane surface is aligned substantially in parallel to the upper edge of the build-up container. The support 2 is adapted to support an object 3 to be formed. In FIG. 1, the object 3 to be formed is shown in an intermediate state in which a plurality of layers of the powdery constituent material have already been selectively solidified and are surrounded by un-solidified constituent material 4. As indicated by a vertical double-headed arrow in FIG. 1, the support 2 is movable in a vertical direction by a (not shown) height changing device. The plane in which the powder material is applied and solidified forms a working plane 5.

Further, an applicator is provided for applying a powdery constituent material which can be solidified by electromagnetic radiation onto the working plane. The applicator has an application unit 6 which is formed by example in form of a trough filled with powdery constituent material and can be provided with a dosing device by which a predetermined amount of constituent material is delivered. The applicator further has a blade unit 7 which can be moved in a horizontal direction in parallel to the working area 5 as indicated in FIG. 1 by a horizontal double-headed arrow. The area of the apparatus in which the object 3 is built-up generally is referred to as a build-up area 8.

The apparatus further has a radiation source, e.g. in form of a laser 10 generating a laser beam 11. Above the build-up container 1, a deflection unit, e.g. a tilted mirror 12 which can be swiveled by a (not shown) swiveling unit, and a focusing unit 13 are arranged.

The apparatus has a control unit 15. Among others, the control unit 15 controls the vertical movement of the support 2, the horizontal movement of the application unit 6 and the blade unit 7, the swiveling of the tilted mirror 12 and the focusing by the focusing unit 13.

Figure 2:
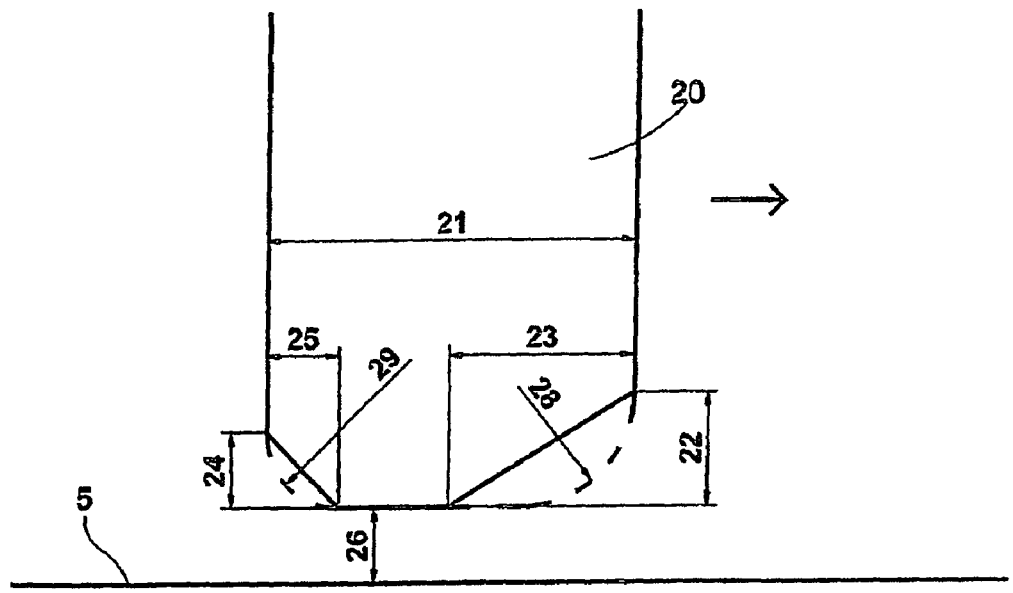
FIG. 2 is a sectional view of a portion of an exemplary blade.

FIG. 2 shows a section through a portion of an exemplary blade 20 contained in the blade unit 7. The blade substantially has the form of a flat plate extending over the entire width of the area to be powdered. In addition to the properties of the constituent material, especially the following properties of the blade 20 are important for the properties of the applied layer: the thickness 21 of the blade 20, the height 22 and length 23 of a chamfer in a application direction indicated by an arrow, the height 24 and length 25 of a chamfer in a direction opposite to the application direction, and the height 26 above the working plane 5. As an alternative to the shown blade 20, a blade may be used which has a chamfer only in one direction or which has a rounding with a predetermined radius 28, 29 instead of a chamfer (indicated in FIG. 2 by a dotted line).

According to the present invention, the applicator 6, 7 contains an exchangeable applying module, for example a blade module 30, and a receiving device for receiving the applying module, in the present example correspondingly a blade module holder 40 formed to receive the blade module 30.

Figure 3:
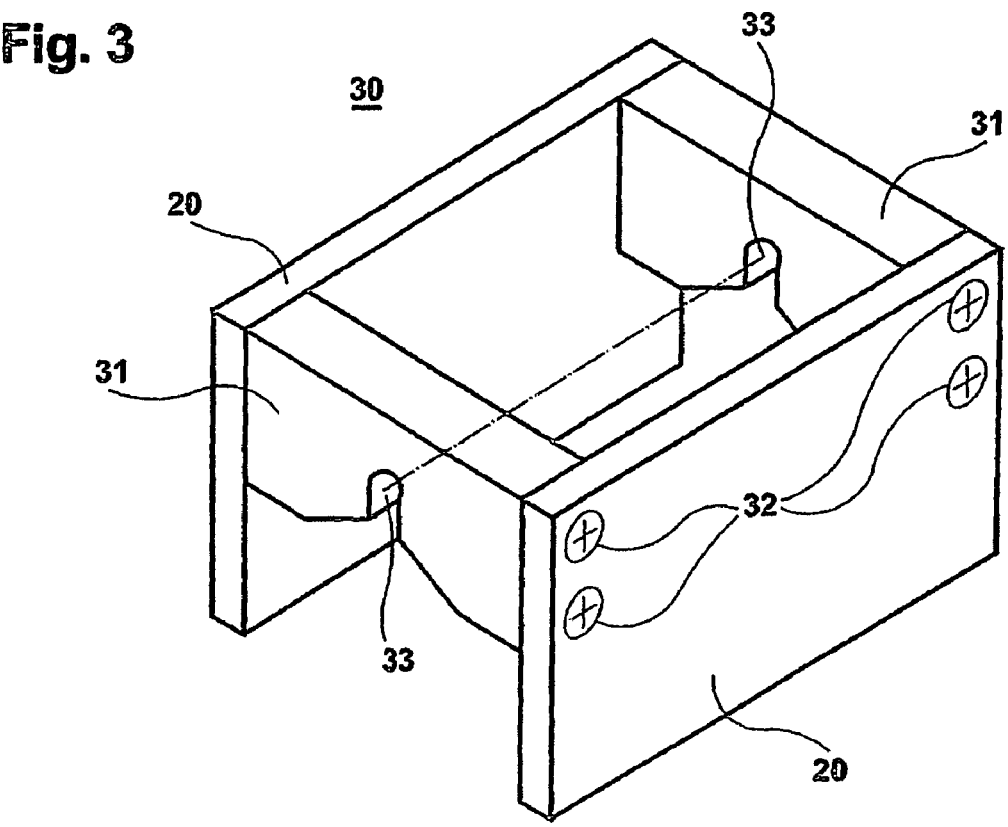
FIG. 3 is a perspective view of an embodiment of an exchangeable blade module.

FIG. 3 is a perspective view of an embodiment of an exchangeable blade module 30. The shown blade module has two blades extending over the entire width of the area to be powdered and being arranged symmetrically to each other. To simplify the drawing, the lower edges of the blades 20 which in an operating state face the working plane 5 are shown without chamfers or roundings.

The two blades 20 are connected to each other at their ends by a connecting bar 31, respectively. Attaching the blades to the connecting bars is achieved by attaching elements 32, e.g. by screws which are screwed through holes formed in the blades into threads formed in the connecting bars.

Starting from their lower sides which in an operating state face the working plane 5, the connecting bars 31 each have a recess 33 in form of a oblong hole with a rounded end. The semi-cylindrical ends of the recesses 33 are arranged in a manner that they have a common center line. The transition between the lower side of the connecting bars 31 and the recesses 33 may be chamfered in order to facilitate the insertion of the blade module 30 into the blade module holder.

FIG. 4 is a perspective view of an embodiment of a blade module holder 40. The shown blade module holder has a front wall 41, a rear wall 42 and two side walls 43. The rear wall of the blade module holder 40 is connected to the portion of the apparatus which can be moved into the application direction.

Into both the front wall 41 and the rear wall 42, a supporting shaft 44 is inserted in a manner to protrude by a predetermined length into the interior of the blade module holder 40. The supporting shafts 44 are arranged in a manner to have a common center line which is parallel to the working plane 5 and orthogonal to the application direction. As an alternative, a supporting shaft can be formed continuously from the front wall 41 to the rear wall 42. The diameter of the supporting shafts 44 is selected in a way that they can enter into the recesses 33 of the connecting bars 31 of the blade module 30. Preferably, the diameter of the supporting shafts 44 substantially corresponds to the diameter of the semi-cylindrical ends of the recesses 33.

At the upper side, farther from the working plane 5, of one of the side walls 43, pressing plates 45 are attached near the front wall 41 and the rear wall 42, respectively, by hinges 46 in a rotatable manner so that they can be swiveled towards the other side wall 43 and locked in this state. The pressing plate 45 near the rear wall 42 has approximately in the center of its lower side, which in the closed state faces the interior of the blade module holder 40, a pressing unit 47 which is for example realized by an element which is elastic in compression such as a compression spring. The pressing plate 45 near the front wall 41 has on its lower side and laterally displaced from the center on its one side a return unit 48 which is for example realized by an element which is elastic in compression such as a return spring, and on its other side a stop 49. The stop 49 may be adjustable in height, for example by being formed as a setting element like a setting screw screwed into the pressing plate 45.

It is of highest importance for manufacturing a three-dimensional object that powdering by a dual-blade applicator has the same results in both application directions, e.g. the same layer thickness and the same compaction of the layer. For this purpose, it is required that both blades have the same distance from the working plane 5. If the stop is adjustable in height, the same height of the blades 20 above the working plane 5 can be adjusted. Preferably, the stop 49 is formed in a manner that this height adjustment is still possible after inserting the blade module 30 into the blade module holder 40.

FIG. 5 is a perspective view of an embodiment of an adjusting device 50 for an exchangeable blade module 30. The shown adjusting device has a base plate 51 and two side walls 52

Into each of the side walls 52, a supporting shaft 53 is inserted in a manner to protrude by a predetermined length into the interior of the adjusting device 50. The supporting shafts 63 are arranged in a manner to have a common center line which is parallel to the base plate 51. The diameter of the supporting shafts 53 is selected in a way that they can enter into the recesses 33 of the connecting bars 31 of the blade module 30. Preferably, the diameter of the supporting shafts 53 substantially corresponds to the diameter of the semi-cylindrical ends of the recesses 33.

Into the base plate, two round bars 54 are inserted in a distance to each other in a way that their summit lines run in the same height in parallel to the base plate 51.

To operate the apparatus, the blade modules 30 are first adjusted as required. For this purpose, a pre-assembled blade module 30 is inserted into the adjusting device 50 in a way that the supporting shafts 53 enter into the recesses 33 of the connecting bars 31 and the ends of the recesses 33 rest on the supporting shafts 53. By the round bars 54, the blades 20 (which are only loosely attached) are brought into a position in which they are parallel to the surface of the ground plate 51. In this state, the attaching elements 32, e.g. the fixing screws, are tightened. This makes sure that the lower edges of the blades run in parallel to each other and that they run in parallel to the working plane 5 in the inserted state of the blade module 30.

By using blades 20 with different properties and by changing the height of the supporting shafts 53 with respect to the round bars 54 (e.g. by exchangeable inserts having supporting shafts 53 in the side walls 53 or by using different adjusting devices 50), a plurality of blade modules can be adjusted in advance to be optimized for different material properties and/or layer thicknesses.

For a specific application (e.g. a specific material having a specific particle size and a specific layer thickness), the optimally suited module is selected from among the blade modules 30 adjusted in advance and inserted into the blade module holder 40.

For this purpose, the blade module 30 first is put onto the supporting shafts 44 in a way that those enter into the recesses 33 of the connecting bars 31 and the ends of the recesses 33 rest on the supporting shafts 44. The blade module 30 can be swiveled around the supporting shafts 44.

Thereafter, the two pressing plates 45 are swiveled into the closed state and locked. Thereby, the compression spring presses from above onto the blade module 30 and thus presses it against the corresponding supporting shaft 44. The return spring presses laterally displaced to the other supporting shaft 44 onto the blade module 30 and thus counteracts a swiveling movement of the blade module 30 until the upper side of blade module 30 abuts against the stop 49. Thus, the position of the blade module 30 at its insertion into the blade module holder 40 is reproducibly determined.

The return spring 48 and the stop 49 together press the connection bar 31 against the supporting shaft 44. The height of the stop 49 above the lower side of the pressing plate 45 has been adjusted in advance in a way that the two lower edges of the blades 20 (which by their pre-adjustment already are in parallel to each other and to the working plane) have the same distance from the working plane 5. However, the height of the stop 49 can also be changed after the blade module 30 has been inserted in order to adjust the lower edges of the blades 20 to the same distance from the working plane 5. Depending on the adjusting direction, the blade module 30 thereby is moved by the advancing stop 49 against the return force of the return spring 48 or by the return spring 48 against the receding stop 49.

Thus, the blade module 30 can quickly, easily and without a separate tool be inserted into and removed from the blade module holder 40.

In order to build-up an object 3, the control unit first controls the height adjustment of the support 2 in a way that the surface of the support (or in later steps the surface of the already formed part of the object 3 and the surrounding unsolidified constituent material 4) lies in the working plane 5. By a horizontal movement of the application unit 6 and the blade unit 7, a layer of the powdery constituent material is then applied onto the working plane 5 and smoothed by the blades 7. This is carried out for example in a way that the application unit delivers a pre-determined amount of the powdery constituent material between the two blades 20 of the blade module 30, which then is smoothed to a uniform layer and possibly compacted by the blade 20 which is arranged at the rear in the moving direction.

After the application of the layer, the laser beam 11 is deflected and focused by the tilted mirror 12 and the focusing unit 13 in a way that it subsequently scans the positions of the applied powder layer which are to be solidified and thus solidifies the powder. Thereafter, the support is moved downwards by a moving distance which corresponds to the thickness of a layer, and the entire process is repeated until the object 3 is completed. Therein, the moving direction of the application unit 6 and the blade unit 7 is reversed between two subsequent application processes, respectively.

The invention is not limited to the described embodiments. Based on the shown basic structure, the physical form of the blade module and the blade module holder and the insertion of the blade module in the blade module holder may also be realized in another way which is obvious for a person skilled in the art.

For example, a symmetrically constructed blade module having two symmetrically arranged blades is described in the shown embodiment, so that the powdery constituent material can be applied in two directions. However, the invention may also be applied to a blade module having only one blade 20. Therein, powdering is either only possible in one moving direction of the blade, or the blade is formed in a way that the powdering can be carried out in two opposite directions. Therein, the applicator may be provided with a lifting device which moves the blade module away from the working plane 5, e.g. lifts or swivels the blade module up for a movement over a rest of powder in order to re-use this rest of powder during a movement into the opposite application direction.

The pressing unit 47, the return unit 48 and the fixed or adjustable stop 49 may also be provided at the blade module 30 instead of the blade module holder 40, or they can be distributed on both. Providing them at the blade module is especially advantageous if the sop is adjustable, since the optimum adjustment for the corresponding module is maintained when removing and re-inserting the module and the module thus ca be directly used at its next insertion without further adjusting the stop.

As an alternative, the support shaft 44 can be formed in a way that it protrudes outside of the front and/or rear wall 41, 42 of the blade module holder 40. The pressing unit 47, the return unit 48 and the fixed or adjustable stop 49 in this case may also be arranged outside of the front or rear wall.

As an alternative, the suspension of the blade module 30 in the blade module holder 40 can be formed in a way that the blade module 30 has a supporting shaft and the blade module holder 40 a recess for receiving the supporting shaft.

Swiveling the blade module in the blade module holder may also be carried out in another way than by engaging a supporting shaft with a recess. The blade module may by example comprise three supports by which it is supported in the blade module holder. These supports may rest on a face of the blade module holder or be received in recesses such as round or conical indentations. The resting points of two of these supports define an axis around which the blade module may be tilted, the third support serves as a fixed or adjustable stop to define an end position of the blade module. Alternatively, all the supports or a part thereof may be attached to the blade module holder and rest on a face of the blade module or within indentations of the blade module holder. If instead of or additionally to the stop, one or both of the other supports are adjustable, the spatial position of the tilting axis can be adjusted. Instead of the supports, also the resting points of the support may be adjustable.

Instead of adjusting the blade module using a swiveling movement, the position may also be adjusted by a linear or curved translational movement.

The blade module holder may also be formed by the applicator itself, so that the blade module can be directly be attached to the applicator without a separately provided module holder. This can for example be realized in a way that the applicator has a receiving device, e.g. formed as a plate having only a single spindle, which allows swiveling and adjusting of the module as described above.

The invention is not limited to applicators having blades, either. Any smoothing elements suited for distributing and smoothing the powder may be used. These are among others rigid and flexible blades, brushes, wiper blades such as rubber lips, but also rotatably supported smoothing elements such as rollers. One or more of these smoothing elements are attached to a smoothing module which is formed and insertable into the applicator and adjustable in the same way as described above for the blade module.

Generally, the invention may be applied to modules having any applying elements suited for applying and distributing the powder. These are among others elements for compacting the powder such as shakers or vibrators which may vibrate vertically and/or horizontally in the length or traversal direction in a linear way or on curved paths, elements for tempering the powder such as heatable blades, elements for fluidizing the powder such as a fluidizing plate through which a gas may be introduced into the powder, elements for electrostatically charging or discharging the powder such as a charging or discharging electrode, elements for mixing or sieving the powder and so on. Of these applying elements, at least one is attached to an applying module which is formed and insertable into the applicator and adjustable in the same way as described above for the blade module.

Instead of the laser, any other energy source suited for solidifying the powdery material, e.g. an electron beam source, may be used. Other ways of applying energy such as mask sintering, inhibition sintering, energy application in form of lines or of an array are also possible.

As a powdery constituent material, different materials can be used such as plastics, metal, ceramics, sand, coated powders, powders with plural components, or a combination thereof.

The invention claimed is:

1. Apparatus for manufacturing a three-dimensional object by solidifying a powdery constituent material layer by layer at the positions corresponding to the profile of the object to be manufactured in the corresponding layer, by the action of a laser or another energy source, comprising
   a support on which the object is formed, and
   an applicator for applying a layer of the constituent material onto the support or a layer at least partially solidified in advance and having a receiving device for receiving an applying module,
   wherein the receiving device is formed in a way so that an applying module selected from a plurality of differently pre-adjusted applying modules can be exchangeably inserted into and removed from the receiving device in a way that a predetermined position of the applying module in the receiving device is reproducibly determined, by a swiveling of the applying module in the receiving device,
   wherein the receiving device comprises:
   a supporting device allowing a swiveling movement of the applying module around a predetermined swiveling axis
   a stop for determining the predetermined position, and
   a return unit for urging the applying module by a swiveling movement around the predetermined swiveling axis until it abuts against the stop.

2. Apparatus according to claim 1, wherein the receiving device is formed to receive a smoothing module suited for distributing and smoothing the powdery constituent material.

3. Apparatus according to claim 1, wherein the predetermined position is adjustable before and/or after inserting the applying module into the receiving device.

4. Apparatus according to claim 1, wherein the stop is adjustably formed.

5. Apparatus according to claim 1, wherein the return unit is realized by an element which is elastic in compression.

6. Apparatus according to claim 1, wherein the receiving unit is formed in a way that the applying module is bitable around a predetermined axis, the spatial position of the predetermined axis being adjustable.

7. Apparatus according to claim 1, wherein the receiving device has at least one recess formed to receive the applying module.

8. Apparatus according to claim 1, wherein the receiving device has a pressing unit formed to exert a compressive force between the applying module and the receiving device, wherein the pressing unit is realized by an element which is elastic in compression.

9. Apparatus according to claim 8, wherein
   the receiving device has a pressing plate formed in a way so that it can be brought into a position above the applying module, and
   the pressing unit is attached at the pressing plate.

10. Apparatus according to claim 1, wherein
    the receiving device has a stop for determining the predetermined position,
    the receiving device has a pressing plate formed in a way so that it can be brought into a position above the applying module, and
    the return unit and the stop are attached at the pressing plate.

11. Apparatus according to claim 10, wherein the return unit and the stop are attached at the same pressing plate as the pressing unit.

12. Apparatus according to claim 1, wherein the receiving device is formed in a way that the applying module can be inserted without tools into the receiving device.

13. Applying module, adapted to the insertion into an apparatus for manufacturing a three-dimensional object by solidifying a powdery constituent material layer by layer at the positions corresponding to the profile of the object to be manufactured in the corresponding layer, by the action of a laser or another energy source, comprising
    a first applying element suited for applying and distributing the powdery constituent material,
    at least one insertion element to which the applying element is attached and which is formed to insert the applying module in a predetermined position into the apparatus in a way that the applying module can be exchangeably inserted into and removed from the apparatus in a way that a predetermined position of the applying module in the apparatus is reproducibly determined,
    a supporting device allowing a swiveling movement of the applying module around a predetermined swiveling axis in the apparatus,
    a stop for determining the predetermined position, and
    a return unit for urging the applying module by a swiveling movement around the predetermined swiveling axis until it abuts against the stop.

14. Applying module according to claim 13, wherein the applying element is an element among elements for compacting the powder, elements for tempering the powder, elements for fluidizing the powder, elements for electrostatically charging or discharging the powder, and/or elements for mixing or sieving the powder.

15. Applying module according to claim 13, wherein the applying element is a smoothing element suited for distributing and smoothing the powdery constituent material, including one of a rigid or flexible blade, a brush, a wiper blade including a rubber lip, or a rotatably supported applying element including a roller, the applying module thus being a smoothing module.

16. Applying module according to claim 13, wherein the applying element is a blade suited for distributing and smoothing the powdery constituent material to a layer, the applying module thus being a blade module.

17. Applying module according to claim 13, wherein a second applying element is arranged substantially in parallel to the first applying element and attached to the insertion element.

18. Applying module according to claim 13, wherein the insertion element is formed in the form of to connecting bars parallel to each other, the applying elements being attached via attaching elements to the connecting bars.

19. Applying module according to claim 13, which is formed in a way that it can be tilted in the receiving device around a predetermined axis, the spatial position of the tilted predetermined axis being adjustable.

20. Applying module according to claim 13, wherein the stop is adjustably formed.

21. Applying module according to claim 13, comprising a pressing unit formed to exert a compressive force between the applying module and the receiving device.

22. Applying module according to claim 13, being formed in a way to be inserted without tools into the apparatus.

23. Apparatus for manufacturing a three-dimensional object by solidifying a powdery constituent material layer by layer at the positions corresponding to the profile of the object to be manufactured in the corresponding layer, by the action of a laser or another energy source, comprising:

a support on which the object is formed, an applicator for applying a layer of the constituent material onto the support or a layer at least partially solidified in advance, and an applying module, wherein the applicator has a receiving device for receiving the applying module, the receiving device being formed in a way so that an applying module selected from a plurality of differently pre-adjusted applying modules can be exchangeably inserted into and removed from the receiving device in a way that a predetermined position of the applying module in the receiving device is reproducibly determined, by a swiveling of the applying module in the receiving device, wherein the apparatus further comprises:

a supporting device allowing a swiveling movement of the applying module around a predetermined swiveling axis a stop for determining the predetermined position, and a return unit for urging the applying module by a swiveling movement around the predetermined swiveling axis until it abuts against the stop.

24. Apparatus according to claim 23, wherein the stop and the return unit are arranged at the receiving device.

25. Apparatus according to claim 23, wherein the stop and the return unit are arranged at the applying module.

26. Apparatus according to claim 23, wherein one of the stop and the return unit is arranged at the receiving device and the other of the stop and the return unit is arranged at the applying module.

27. Apparatus according to claim 23, wherein the receiving device is formed to receive a smoothing module suited for distributing and smoothing the powdery constituent material.

28. Apparatus according to claim 23, wherein the predetermined position is adjustable before and/or after inserting the applying module into the receiving device.

29. Apparatus according to claim 23, wherein the stop is adjustably formed.

30. Apparatus according to claim 23, wherein the return unit is realized by an element which is elastic in compression.

31. Apparatus according to claim 23, wherein the receiving unit is formed in a way that the applying module is tiltable around a predetermined axis, the spatial position of the predetermined axis being adjustable.

32. Apparatus according to claim 23, wherein the receiving device has at least one recess formed to receive the applying module.

33. Apparatus according to claim 23, wherein the receiving device has a pressing unit formed to exert a compressive force between the applying module and the receiving device, wherein the pressing unit is realized by an element which is elastic in compression.

34. Apparatus according to claim 33, wherein the receiving device has a pressing plate formed in a way so that it can be brought into a position above the applying module, and the pressing unit is attached at the pressing plate.

35. Apparatus according to claim 23, wherein the receiving device has a stop for determining the predetermined position, the receiving device has a pressing plate formed in a way so that it can be brought into a position above the applying module, and the return unit and the stop are attached at the pressing plate.

36. Apparatus according to claim 35, wherein the return unit and the stop are attached at the same pressing plate as the pressing unit.

37. Apparatus according to claim 23, wherein the receiving device is formed in a way that the applying module can be inserted without tools into the receiving device.

* * * * *